United States Patent
Asai et al.

(10) Patent No.: US 7,053,317 B2
(45) Date of Patent: May 30, 2006

(54) HOPPER AND WEIGHING APPARATUS EQUIPPED WITH THE SAME

(75) Inventors: Yoshiharu Asai, Ritto (JP); Shizuo Minamino, Ritto (JP); Hiroshi Hattori, Ritto (JP); Shingo Yamamoto, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 17 days.

(21) Appl. No.: 10/496,396

(22) PCT Filed: Jun. 23, 2003

(86) PCT No.: PCT/JP03/07947

§ 371 (c)(1),
(2), (4) Date: May 24, 2004

(87) PCT Pub. No.: WO2004/003491

PCT Pub. Date: Jan. 8, 2004

(65) Prior Publication Data

US 2005/0087372 A1    Apr. 28, 2005

(30) Foreign Application Priority Data

Jun. 26, 2002    (JP) .............................. 2002-185881

(51) Int. Cl.
G01G 19/387 (2006.01)
A23L 3/00 (2006.01)

(52) U.S. Cl. .................. 177/25.18; 177/103; 177/108; 222/181.1; 222/502; 222/504

(58) Field of Classification Search ............. 177/25.18, 177/103–104, 108, 126–128; 222/181.1–181.3, 222/502–505
See application file for complete search history.

(56) References Cited

U.S. PATENT DOCUMENTS

| 5,379,923 | A  | * | 1/1995 | Sagastegui et al. ...... 222/181.2 |
| 6,188,029 | B1 | * | 2/2001 | Miyamoto et al. .......... 177/105 |
| 6,674,021 | B1 | * | 1/2004 | Tanaka et al. ........... 177/25.18 |
| 2002/0157875 | A1 | * | 10/2002 | Tanaka et al. |

FOREIGN PATENT DOCUMENTS

| JP | 2001-264153 A | 9/2001 |
| JP | 2001-349768 A | 12/2001 |
| JP | 2001-349769 A | 12/2001 |
| JP | 2001-356043 A | 12/2001 |

* cited by examiner

Primary Examiner—Randy W. Gibson
(74) Attorney, Agent, or Firm—Shinjyu Global IP Counselors (57) ABSTRACT

The object of the present invention is to provide a hopper having a simplified structure that can prevent fragments of component parts generated by vibrations and bolts, nuts, etc., that have fallen out of place from intermixing with the articles in the weighing hoppers or on the conveyor of a combination weighing apparatus. A link mechanism for opening and closing a gate is arranged on a plate provided on one side of the box-like body of a pool hopper. A cover that covers the entire link mechanism is provided and the cover is configured such that it can be freely attached to and detached from the box-like body. The cover can be attached to and detached from the box-like body by engaging and disengaging an engaging member of the cover with and from a nut coupled to the box-like body.

11 Claims, 10 Drawing Sheets

HOPPER AND WEIGHING APPARATUS EQUIPPED WITH THE SAME

This application is the National Stage of International Application No. PCT/JP03/07947, which has been filed on Jun. 23, 2003 and published on Jan. 8, 2004, and which claims priority to Japanese application 2002-185881, filed Jun. 26, 2002.

TECHNICAL FIELD

The present invention relates to an improvement to a hopper constructed to hold and discharge articles and a weighing apparatus equipped with the hopper. The present invention belongs to the field of article weighing technologies.

BACKGROUND ART

Combination weighing apparatuses used for automated weighing of a variety of articles are provided with multiple weighing hoppers. With this kind of combination weighing apparatus, articles are dispersed/supplied to each of the weighing hoppers through pool hoppers correspondingly arranged above the weighing hoppers. Next, the weights of the articles in the weighing hoppers are measured and a combinational computation is performed based on the measured weight values. Then, the optimum combination for which the combined weight is within a prescribed allowed error tolerance and closest to a target weight is calculated and only the articles in the weighing hoppers corresponding to this optimum combination are discharged. As a result, the combination weighing apparatus obtains the article with the weight that is closest to the target weight.

In some cases, the hoppers are so constructed as to include a pipe-like body (box-like body) that is open at the top and bottom, a gate that is attached in a freely swingable manner to the pipe-like body and serves to open and close the bottom opening of the pipe-like body, and a link mechanism serving to transfer a driving force from an external drive source in such a manner as to swing the gate. In this type of hoppers, the link mechanism is formed complexly with the nuts, bolts, link members, and other parts, so debris and dust readily accumulates on the component members and connection portions of the link mechanism. Therefore the component members and connection portions of the link mechanism are sometimes covered with a cover.

An example of attaching a cover to a combination weighing apparatus is the invention disclosed in Japanese Laid-Open Patent Publication No. 2001-264153. The apparatus disclosed in that publication is provided with a hollow hopper support arm. The hollow hopper support arm extends from the main unit to the hopper and encloses a power transmission mechanism configured to transmit power from the drive source to the link mechanism. Thus, since the power transmission mechanism and the link mechanism are not exposed, accumulation of debris and dust on these mechanisms is avoided and the mechanisms are kept cleaner.

In another apparatus presented in Japanese Laid-Open Patent Publication No. 2001-349769, a lateral face of the main unit and the arm extending from the lateral face of the main unit are connected by a cover. Thus, the gap between the arm and an opening formed in the lateral face of the main unit is blocked and dust and moisture are prevented from entering the main unit.

In still another apparatus presented in Japanese Laid-Open Patent Publication No. 2001-349768, a plurality of covers are provided—one for each vertical column of hoppers arranged around the outside of the main unit. The covers are made of stainless steel or other metal that has been shaped by bending and are attached to each vertical column of hoppers such that the upper surface of each cover covers approximately the rear half of a conveying trough, where "rear" is defined in terms of the conveying direction. The front and lateral faces of the covers cover the top inlet openings and the entire lateral face of the stock hoppers and weighing hoppers as well as the top inlet openings and the approximately the upper half of the lateral faces of the memory hoppers. As a result, debris and other contaminants can be prevented from entering through the inlet openings of the hoppers.

However, although the apparatuses presented in Japanese Laid-Open Patent Publication No. 2001-349768 and Japanese Laid-Open Patent Publication No. 2001-349769 are configured to prevent the accumulation of debris and dust and the like inside the main unit and the link mechanism, these apparatuses are not able to solve the following problem. Namely, fragments of resin parts and other component parts that have been damaged by the vibrations resulting from opening and closing the gate can fall and become mixed into the articles, and bolts, nuts, and other parts of the link mechanism that have become loose due to vibrations can also fall and become mixed into the articles. This problem is particularly apparent when the gate is opened and closed at a high speed in order to improve productivity.

Additionally, while it can prevent fragments, bolts, and nuts from becoming mixed with the articles, the apparatus presented in Japanese Laid-Open Patent Publication No. 2001-264153 is configured such that the portion from the power transmission mechanism to the link mechanism is enclosed inside a hollow hopper support arm. Consequently, bolts, nuts, and other items that have fallen cannot easily be removed. Furthermore, the cover structure is complex and disadvantageous in terms of manufacturing ease and cost.

DISCLOSURE OF THE INVENTION

The object of the present invention is to provide a hopper having a simplified structure that can prevent fragments of component parts generated by vibrations and bolts, nuts, etc., that have fallen out of place from intermixing with the articles and also to provide a weighing apparatus equipped with such a hopper.

In order to achieve this object, the present invention incorporates the following constituent features.

The invention described in accordance with the first aspect of this application is a hopper provided with the following: a pipe-like body that is open at the top and bottom; a gate configured to swing freely with respect to the pipe-like body and open and close the bottom opening of the pipe-like body; a link mechanism configured to transmit driving power from an external drive source in such a manner as to swing the gate; and a cover that covers the link mechanism at least from below.

Although there will be times when fragments of component parts of the link mechanism that have been damaged due to vibrations caused by the opening and closing operation of the gate and bolts, nuts, etc., that have become loose due to vibrations will fall, this invention can prevent such fallen fragments, bolts, and nuts from intermixing with the articles because a cover is attached so as to cover the bottom of the link mechanism.

The invention described in accordance with the second aspect is a hopper as described in the first aspect, wherein the cover covers the entire link mechanism.

With this invention, intermixing of fallen fragments, bolts, nuts, etc., in the articles is completely eliminated because the entire link mechanism is covered by the cover. Also, dust can be prevented from accumulating in the link mechanism because the entire link mechanism is covered by the cover.

The invention described in accordance with the third aspect is a hopper as described in the first or second aspect, wherein the link mechanism is so arranged as to be concentrated on one side of the pipe-like body.

With this invention, the cover only needs to be attached to one side of the pipe-like body because the link mechanism is concentrated on one side of the pipe-like body. This arrangement is advantageous in terms of cost and streamlines the external appearance of the hopper.

The invention described in accordance with the fourth aspect is a hopper as described in any one of the first through third aspects, wherein the cover can be freely attached to and detached from the pipe-like body.

With this invention, since the cover can be freely attached to and detached from the pipe-like body, it is easier to clean the inside of the cover as well as the main unit and maintenance of the link mechanism can be performed more easily.

The invention described in accordance with the fifth aspect is a weighing apparatus equipped with a hopper as described in any one of the first through fourth aspects.

With this invention, by equipping a weighing apparatus with a hopper as described in any one of the first through fourth aspects; a weighing apparatus is achieved in which fragments of component parts and fallen bolts and nuts resulting from vibrations caused by opening and closing the gate can be prevented from entering the articles.

PREFERRED EMBODIMENTS OF THE INVENTION

An embodiment of combination weighing apparatus in accordance with the present invention will now be described.

Figure 1:
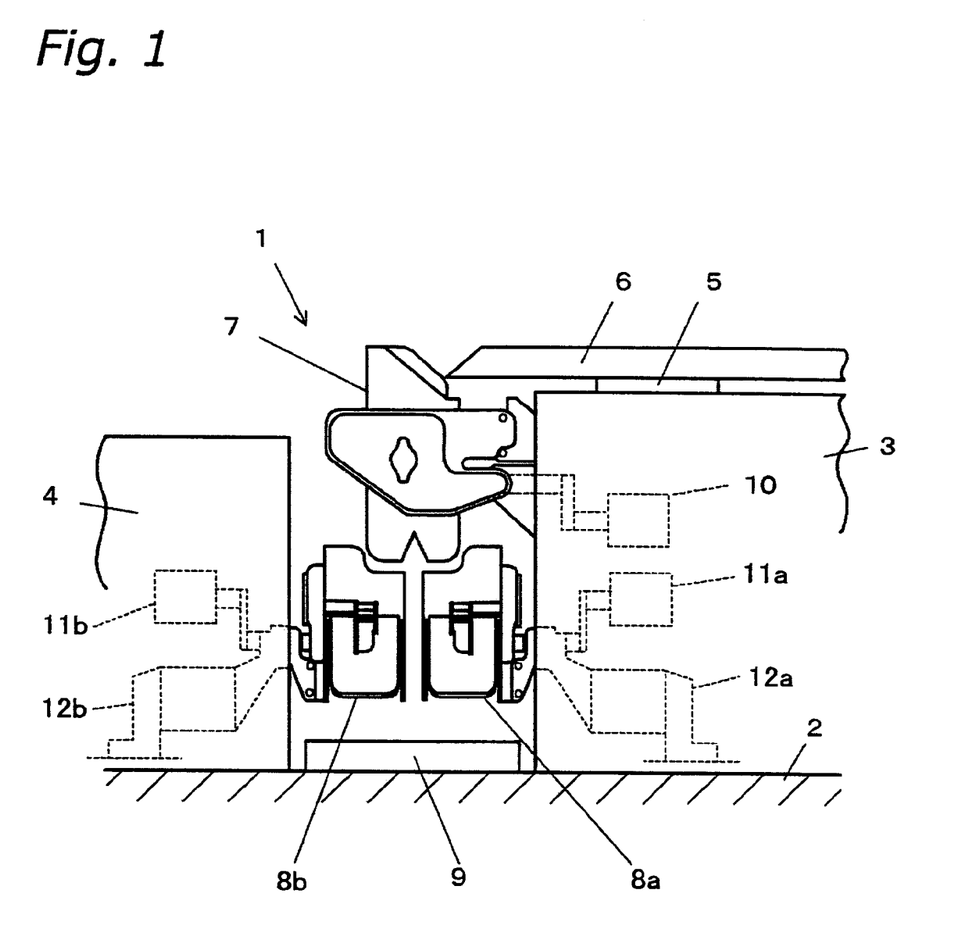
FIG. 1 is a diagrammatic side view of a combination weighing apparatus.

As shown in FIG. 1, the combination weighing apparatus 1 of this embodiment is provided with main unit case 3 and a sub case 4 arranged opposite each other in a parallel manner on a frame 2. The combination weighing apparatus 1 is provided with a trough 6 arranged on the upper surface of the main unit case 3 with a vibrator 5 disposed therebetween. The combination weighing apparatus 1 is also provided with a pool hopper 7 positioned below the tip end of the trough 6 on a lateral surface of the main unit case 3. A first weighing hopper 8a supported on the main unit case 3 and a second weighing hopper 8b supported on the sub case 4 are arranged closely adjacent to each other under the pool hopper 7. A collecting conveyor 9 is arranged on the counter 2 between the main unit case 3 and the sub case 4 of the combination weighing apparatus 1. Open/close drive mechanisms 10, 11a for opening and closing the gates of the pool hopper 7 and the first weighing hopper 8a, respectively, and a load cell 12a for measuring the weight of articles in the first weighing hopper 8a are installed inside the main unit case 3. Meanwhile, an open/close drive mechanism 11b for opening and closing the gate of the second weighing hopper 8b and a load cell 12b for measuring the weight of articles in the second weighing hopper 8b are installed inside the sub case 4. Finally, assuming the equipment from the trough 6 to the first and second weighing hoppers 8a, 8b constitutes one set, this combination weighing apparatus 1 is provided with a plurality of sets arranged in the direction perpendicular to the plane of the paper in FIG. 1.

The operation of the combination weighing apparatus 1 will now be described. In the combination weighing apparatus 1, articles are supplied from the troughs 6 to the first and second weighing hoppers 8a, 8b through the pool hoppers 7. Then the weight of the articles in each weighing hopper is measured and combinational computations are conducted based on the measured weight values. The combination of measured weight values that provides the value that is closest to the target weight but not less than the target weight is selected and the articles in the first and second weighing hoppers 8a, 8b corresponding to said measured weight values are discharged. The discharged articles are collected by the collecting conveyor 9 and articles metered to a value close to the target weight are thereby obtained. During the collecting operation, articles are supplied from the corresponding pool hopper 7 to the first and second weighing hoppers 8a, 8b out of which articles have just been discharged and articles are supplied to the same pool hopper 7 from the trough 6, thereby preparing for the next combination weighing operation.

The constituent features of the pool hopper 7 and the first and second weighing hoppers 8a, 8b will now be described in detail.

Figure 2:
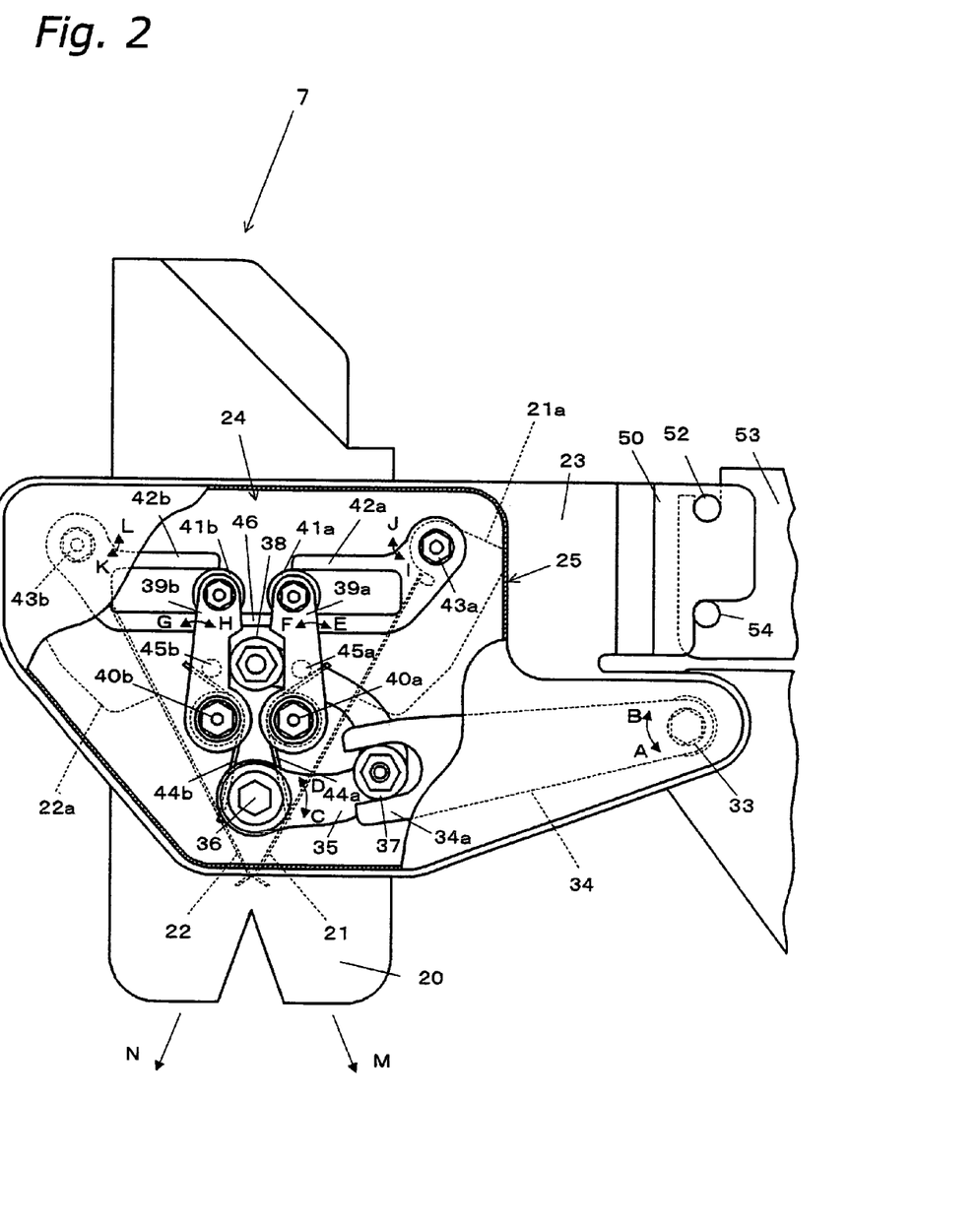
FIG. 2 is a side view of a pool hopper.
Figure 3:
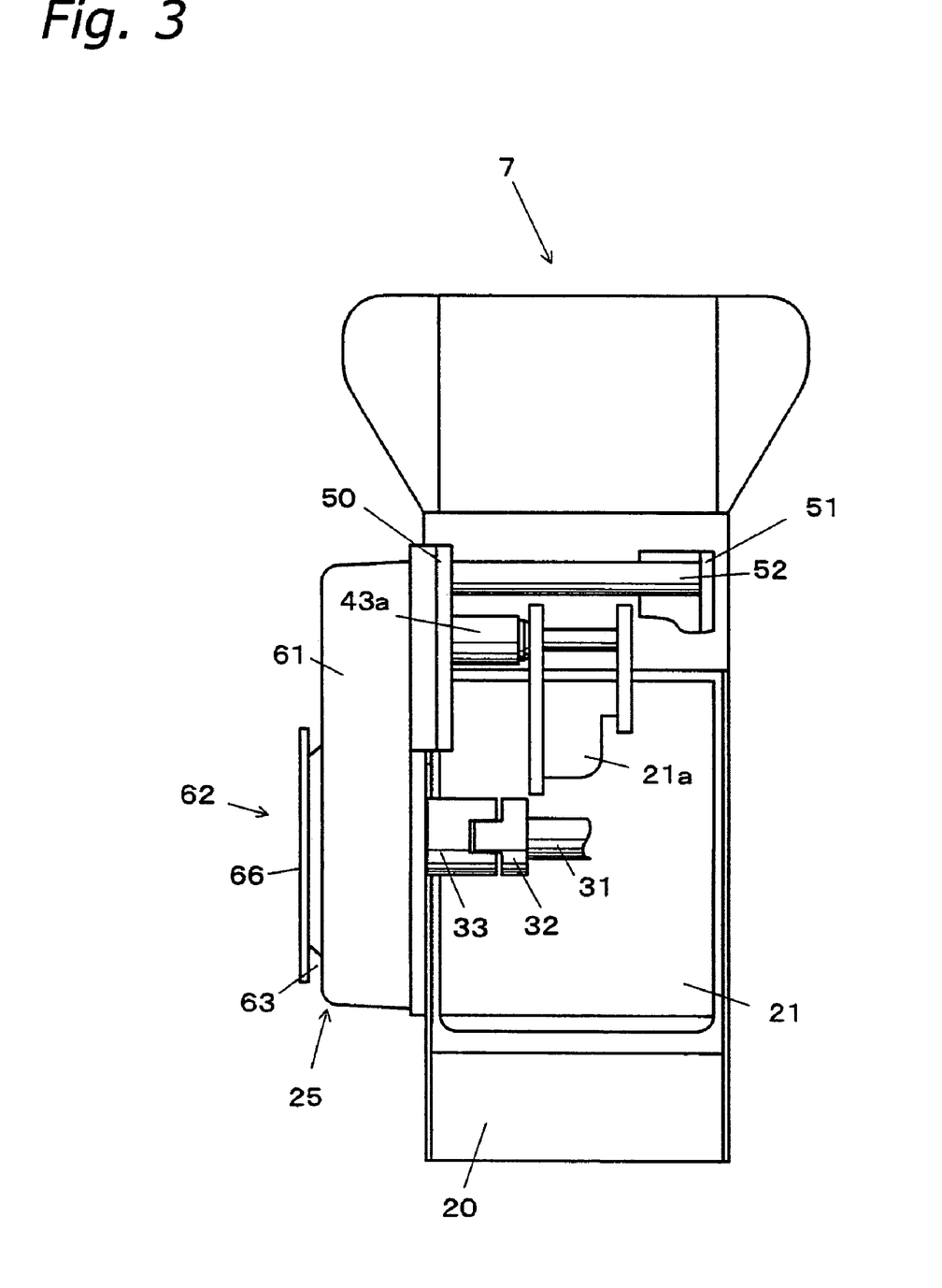
FIG. 3 is a rear view of the pool hopper.

First, the pool hopper 7 will be described using FIGS. 2 and 3. The pool hopper 7 has a rectangular box-like body 20 that is open at the top and bottom and first and second gates 21, 22 that are configured to open and close the bottom opening. A plate 23 is attached to one side face of the box-like body 20, and together forms an example of the pipe-like body. A link mechanism 24 for driving the first and second gates 21, 22 is arranged on the plate 23. Also mounted to the plate 23 is a cover 25 for covering the link mechanism 24. This cover is a characteristic feature of the present invention.

The constituent features of the link mechanism 24 of the pool hopper 7 will now be described. The link mechanism 24 includes a drive shaft 31 that extends from the open/close drive mechanism 10 provided inside the main unit case 3 and an engaging member 32 fixed to the end of the drive shaft 31. The engaging member 32 meshes with a support shaft 33 that is provided on the plate 23 in a location close to the main unit case 3 and configured such that it can turn freely in the directions indicated by arrows A and B. An input link 34 that extends to approximately the middle of the plate 23 and has a U-shaped tip part 34a is fixed to the support shaft 33.

One end of a generally U-shaped intermediate link 35 is supported such that it can turn freely in the directions indicated by arrows C and D about a support shaft 36 provided on a lower part of the plate 23 toward the middle of the plate 23. A roller 37 is provided in the approximate middle of the intermediate link 35 in such a manner that it can rotate freely and engage with the tip part 34a of the input link 34. A roller 38 is provided on the other end of the intermediate link 35 in such a manner that it can rotate freely.

A pair of drive links 39a, 39b arranged symmetrically with respect to a roller 38 that is sandwiched therebetween are supported by each of the drive links 39a, 39b respectively at one end, such that the drive links 39a, 39b can swing freely in the directions of arrows E, F and G, H respectively about support shafts 40a, 40b, which are provided in locations close to the center of plate 23. A roller 41a, 41b is provided at the other end of each drive link 39a, 39b in such a manner that it can rotate freely.

A pair of driven links 42a, 42b each having a long groove in the tip end portion thereof is arranged symmetrically in the vicinity of both ends of an upper portion of the plate 23. These driven links 42a, 42b are fixed to support shafts 43a, 43b and can swing freely in the directions of arrows I, J and K, L, respectively, about the support shafts 43a, 43b. The rollers 41a, 41b of the drive links 39a, 39b are arranged in the long grooves of the driven links 42a, 42b in such a manner that they can slide freely.

Return springs 44a, 44b are provided such that intermediate portions thereof contact the support shafts 40a, 40b of the drive links 39a, 39b. One end of each return spring 44a, 44b engages with the support shaft 36 of the intermediate link 35. The other end of each return spring 44a, 44b engages with a pin 45a, 45b provided in a protruding manner on an approximate center portion of the respective drive link 39a, 39b. The return springs 44a, 44b constantly apply forces against the drive links 39a, 39b in the directions of arrows F and H, respectively.

A stopper 46 is provided on a portion of the plate 23 that is sandwiched between the upper portions of the drive links 39a, 39b. The stopper 46 engages with the drive links 39a, 39b to restrict the swinging of the drive link 39a in the direction of arrow F and the swinging of the drive link 39b in the direction of arrow H.

The first and second gates 21, 22 are fixed to the support shafts 43a, 43b with brackets 21a, 22a.

The links 34, 35, 39a, 39b, 42a, 42b of the link mechanism 24 are mounted to their respective support shafts 33, 36, 40a, 40b, 43a, 43b using bolts and nuts. Bolts and nuts are also used to mount the rollers 37, 38, 41a, 41b to their respective links 35, 39a, 39b. Further details regarding the mounting method are omitted here.

The operation of the link mechanism 24 of the pool hopper 7 will now be described. The drive shaft 31 interlocks with the support shaft 33 of the input link 34 through the engaging member 32 and the input link 34 is swung in the directions of arrows A and B about the support shaft 33 by the open/close drive mechanism 10, which serves as a drive source. The tip part 34a of the input link 34 engages with the roller 37 provided on an intermediate portion of the intermediate link 35 and the intermediate link 35 swings in the directions of arrows C and D about the support shaft 36 when the input link 34 swings in the directions of arrows A and B. The roller 38 provided at the other end of the intermediate link 35 engages with the drive links 39a, 39b and causes them to swing accordingly.

Which drive link 39a, 39b will be swung is determined by the direction, A or B, in which the input link 34 is swung. In other words, when the input link 34 swings in the direction of arrow A, the intermediate link 35 swings in the direction of arrow C about the support shaft 36. Accordingly, the roller 38 of the intermediate link 35 presses against the drive link 39a in opposition to the force of the return spring 44a so as to swing the drive link 39a in the direction of arrow E about the support shaft 40a. Then, the roller 41a of the drive link 39a slides rightward (i.e., rightward as shown in FIG. 2) along the inside of the long groove in the tip of the driven link 42a, causing the driven link 42a to swing in the direction of arrow I about the support shaft 43a. As a result, the first gate 21 also moves in the same direction and is thereby opened. The articles in the pool hopper 7 slide down generally along the second gate 22 so as to be discharged in the direction of arrow M through the bottom opening formed by the first gate 21. Thus, the articles are discharged toward the first weighing hopper 8a.

When the articles have been discharged, the open/close drive mechanism 10 operates such that the input link 34 is swung in the direction of the arrow B. When the input link 34 swings in the direction of arrow B, the intermediate link 35 swings in the direction of arrow D about the support shaft 36. Accordingly, the drive link 39a is released from the pressure of the roller 38 and swings in the direction of arrow F about the support shaft 40a due to the force of the return spring 44a. Then, the roller 41a of the drive link 39a slides leftward (i.e., leftward as shown in FIG. 2) along the inside of the long groove in the tip of the driven link 42a, causing the driven link 42a to swing in the direction of arrow J. As a result, the first gate 21 also moves in the same direction and closes the bottom opening. The swinging of the drive link 39a in the direction of arrow F is restricted by contact with the stopper 46.

When the input link 34 swings in the direction of arrow B, the intermediate link 35 swings in the direction of arrow D about the support shaft 36. Accordingly, the roller 38 of the intermediate link 35 presses against the drive link 39b in opposition to the force of the return spring 44b so as to swing the drive link 39b in the direction of arrow G about the support shaft 40b. Then, the roller 41b of the drive link 39b slides leftward (i.e., leftward as shown in FIG. 2) along the inside of the long groove in the tip of the driven link 42b, causing the driven link 42b to swing in the direction of arrow K. As a result, the second gate 22 also moves in the same direction and is thereby opened. The articles in the pool hopper 7 slide down generally along the first gate 21 so as to be discharged in the direction of arrow N through the bottom opening formed by the second gate 22. Thus, the articles are discharged toward the second weighing hopper 8b.

Thus constituted, the link mechanism 24 can be arranged in such a manner as to be concentrated on one side of the box-like body 20 and the articles can be discharged in either of two directions, as indicated by arrows M and N.

Next, the mounting structure used to mount the pool hopper 7 to the main unit case 3 will be described. A mounting part 50 configured to extend toward the main unit case 3 is provided on the plate 23 of the pool hopper 7 for the purpose of mounting the pool hopper 7 to the main unit case 3. A separate mounting part 51 configured to extend toward the main unit case 3 is provided on the rear surface of the box-like body 20. An engaging rod 52 is provided such that it spans between comparatively upper portions of the mounting parts 50, 51 and notches are provided in comparatively lower portions of the same.

Meanwhile, a pair of hopper support parts 53 configured to face toward the pool hopper 7 is provided on the main unit case 3. An engaging rod 54 is provided such that it spans between comparatively lower portions of the tip edges of the hopper support parts 53, 53 and notches that can engage with the engaging rod 52 are provided in comparatively upper portions of the same. The distance between the tip edges of the pair of hopper support members is slightly smaller than the distance between the mounting parts 50, 51 of the pool hopper 7.

When the pool hopper 7 is mounted to the main unit case 3, the engaging rod 52 of the mounting parts 50, 51 of the pool hopper 7 engages with the notches in the hopper support members 53 of the main unit case 3 and the engaging rod 54 of the hopper support members 53 of the main unit case 3 engages with the notches of the mounting parts 50, 51 of the pool hopper 7. In this way, the pool hopper 7 is supported on the main unit case 3. By using this kind of structure, the pool hopper 7 can be easily attached to and detached from the main unit case 3.

Figure 4:
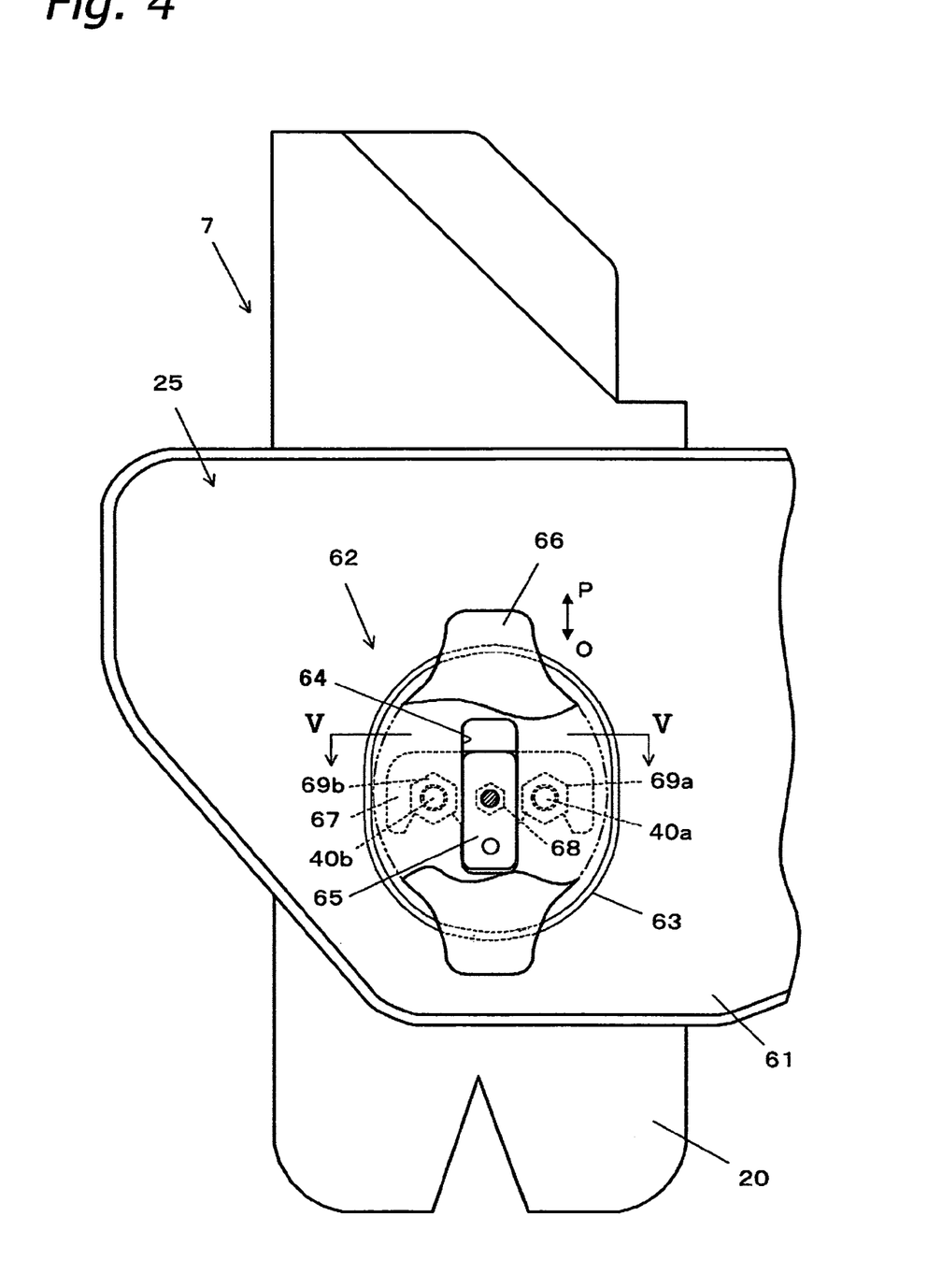
FIG. 4 is a side view illustrating the cover attachment/detachment mechanism of the pool hopper.
Figure 5:
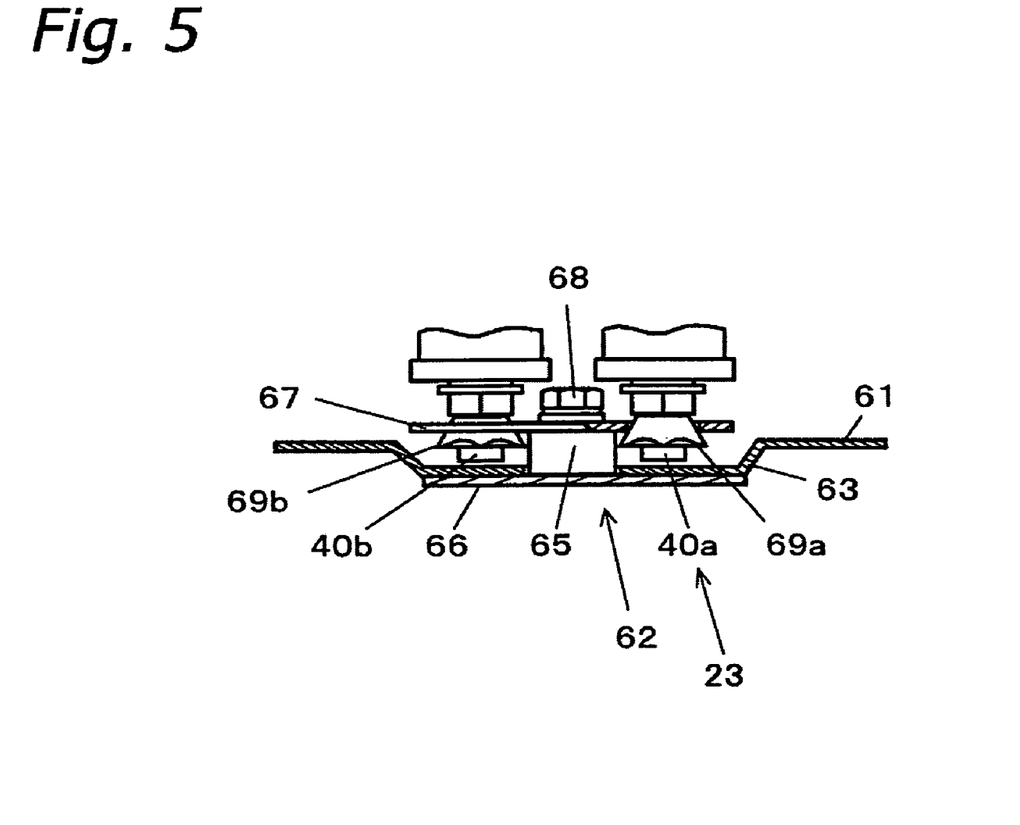
FIG. 5 is a cross sectional view of the main components taken along line V—V of FIG. 4.

Next, the cover 25, which is a characteristic feature of the present invention, will be described using FIGS. 3, 4, and 5. The cover 25 is made up of a cover main body 61 and an attachment/detachment mechanism 62. The cover main body 61 is shaped such that it covers the entire link mechanism 24. An elliptical bulged part 63 is provided in the approximate middle of the cover main body 61 and a long hole 64 is provided in the middle of the bulged part 63.

The attachment/detachment mechanism 62 includes a slide member 65 arranged such that it can slide freely in the long hole 64, an attachment/detachment operating member 66, an engaging member 67, and a nut 68 that fastens the engaging member 67 to the attachment/detachment operating member 66 with the slide member 65 disposed therebetween. The slide member 65 is shaped such that its short side is approximately the same size as that of the long hole 64 but its long side is shorter, and the slide member 65 is arranged such that it can move in the directions of arrows O and P within the long hole 64. The attachment/detachment operating member 66 is mounted to the outside of the cover main body 61 and has a somewhat larger vertical dimension than the bulged part 63 to facilitate easy operation by hand. The engaging part 67 is arranged on the inside of the cover main body 61 and has notches 67a in two locations in a lower portion thereof.

Nuts 69a, 69b having narrowed bases are screwed onto the support shafts 40a, 40b. The notches provided in the engaging part 67 engage with the bases of the nuts 69a, 69b.

Thus, by moving the attachment/detachment operating member 66 in the direction of the arrow O, the cover main body 61 can be fixed in a prescribed position by engaging the notches of the engaging part 67 with the nuts 69a, 69b.

Figure 6:
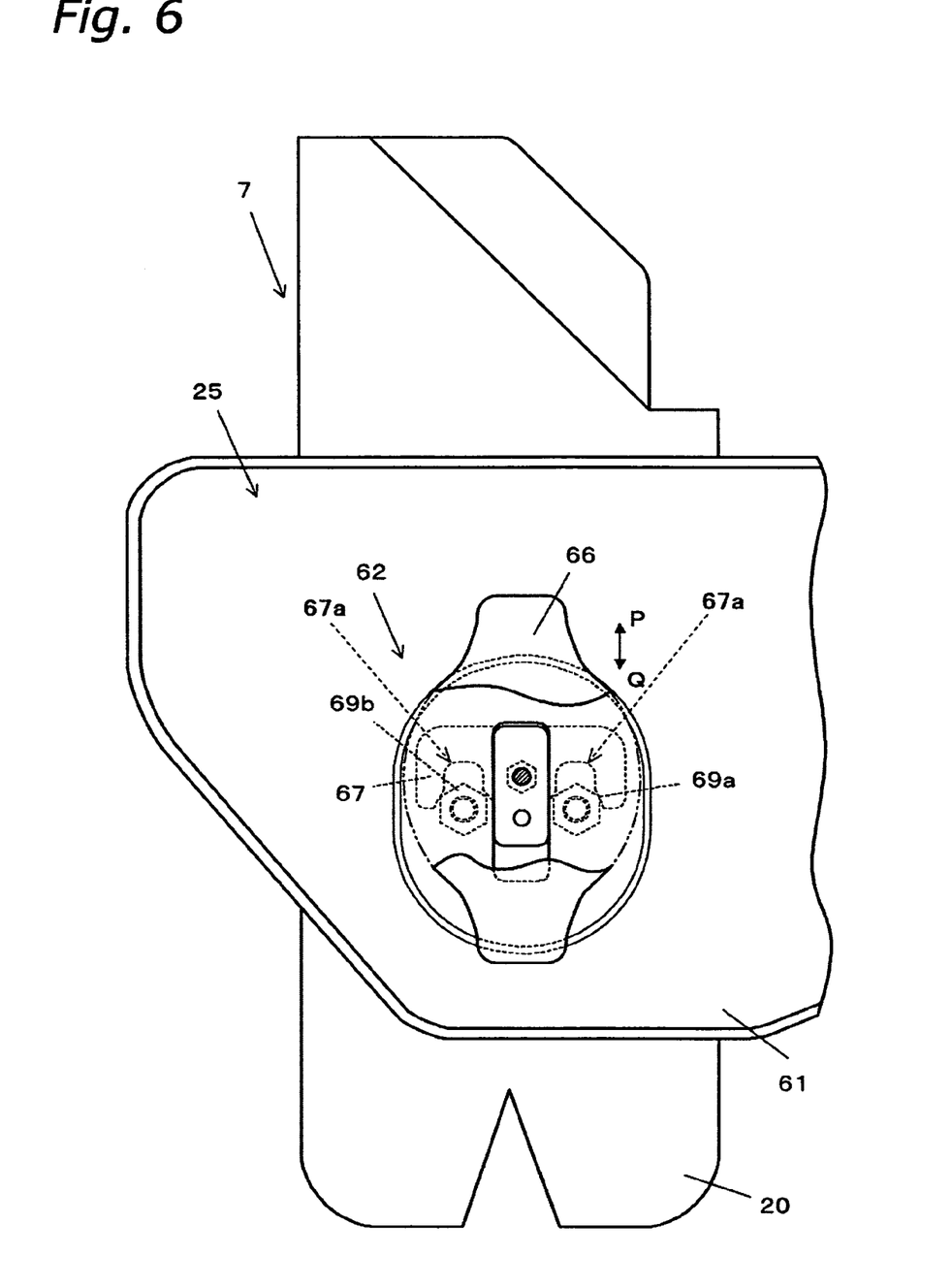
FIG. 6 is a side view illustrating the operation of the cover attachment/detachment mechanism of the pool hopper.

As shown in FIG. 6, when the cover main body 61 is detached from the box-like body 20 of the pool hopper 7, the attachment/detachment operating member 66 is moved in the direction of the arrow P so that the engaging member 67 disengages from the nuts 69a, 69b, allowing the cover main body 61 to be removed with ease.

As described earlier, many nuts and bolts are used in the link mechanism 24 and it is reasonable to believe that vibrations resulting from operation of the combination weighing apparatus 1 might cause some of these nuts and bolts to fall out of place and become intermixed with articles in the first and second weighing hoppers 8a, 8b or the collecting conveyer 9 below. However, since a cover 25 that covers the entire link mechanism 24 is attached to the box-like body 20, fallen bolts and nuts will be caught by the cover main body 61. Thus, fallen bolts and nuts will not become intermixed with the articles. Similarly, fragments resulting from damage to component parts of the link mechanism 24 caused by vibrations are also prevented from intermixing with the articles.

Also, since the link mechanism 24 is so arranged as to be concentrated on one side of the box-like body 20, only one cover 25 is needed to cover the link mechanism 24. Moreover, since the cover 25 can be freely attached to and detached from the box-like body 20, it is easier to clean the inside of the cover 25 as well as the main unit case 3 and it is also easier to perform maintenance on the link mechanism 24.

Figure 7:
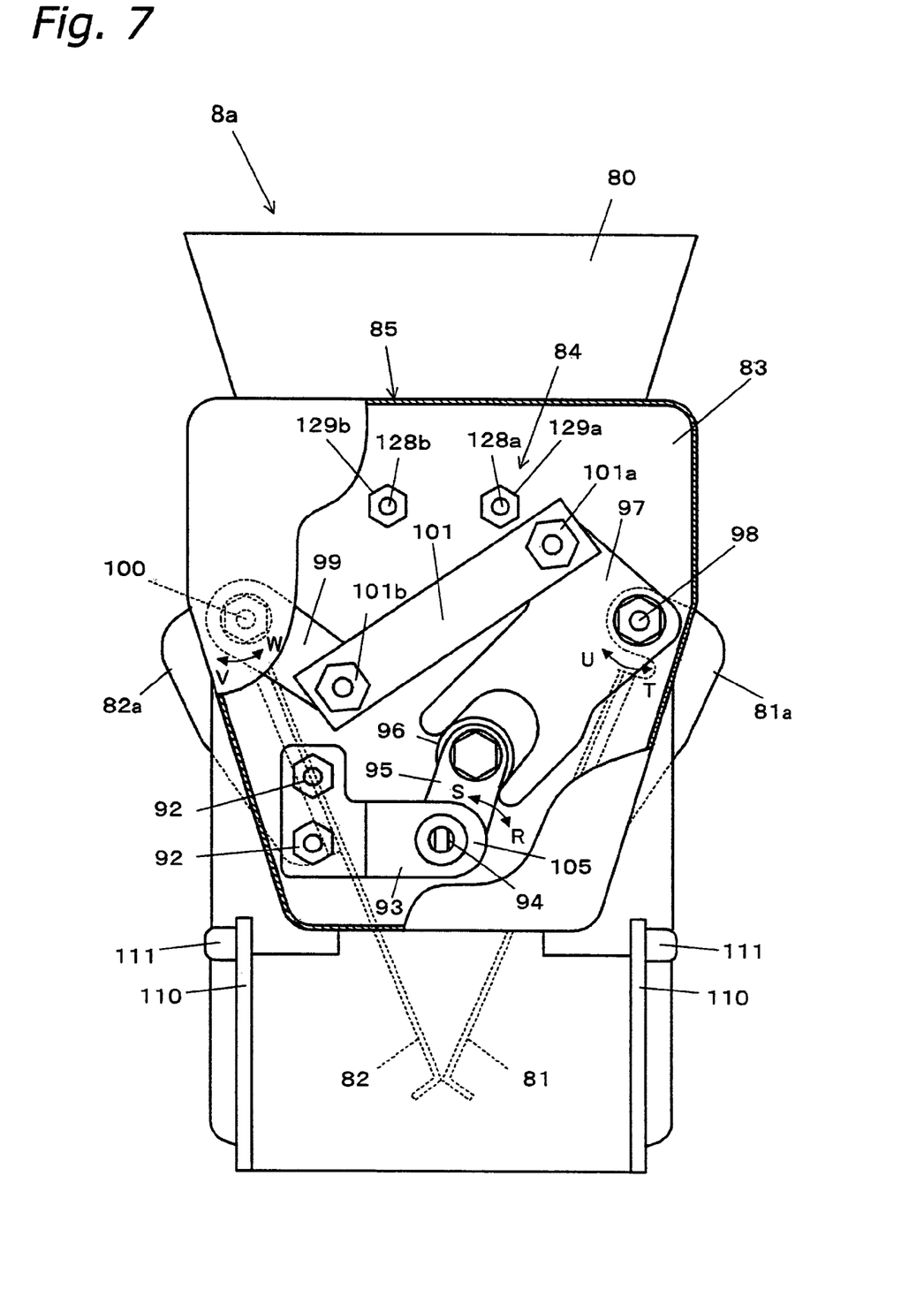
FIG. 7 is a rear view of a weighing hopper.
Figure 8:
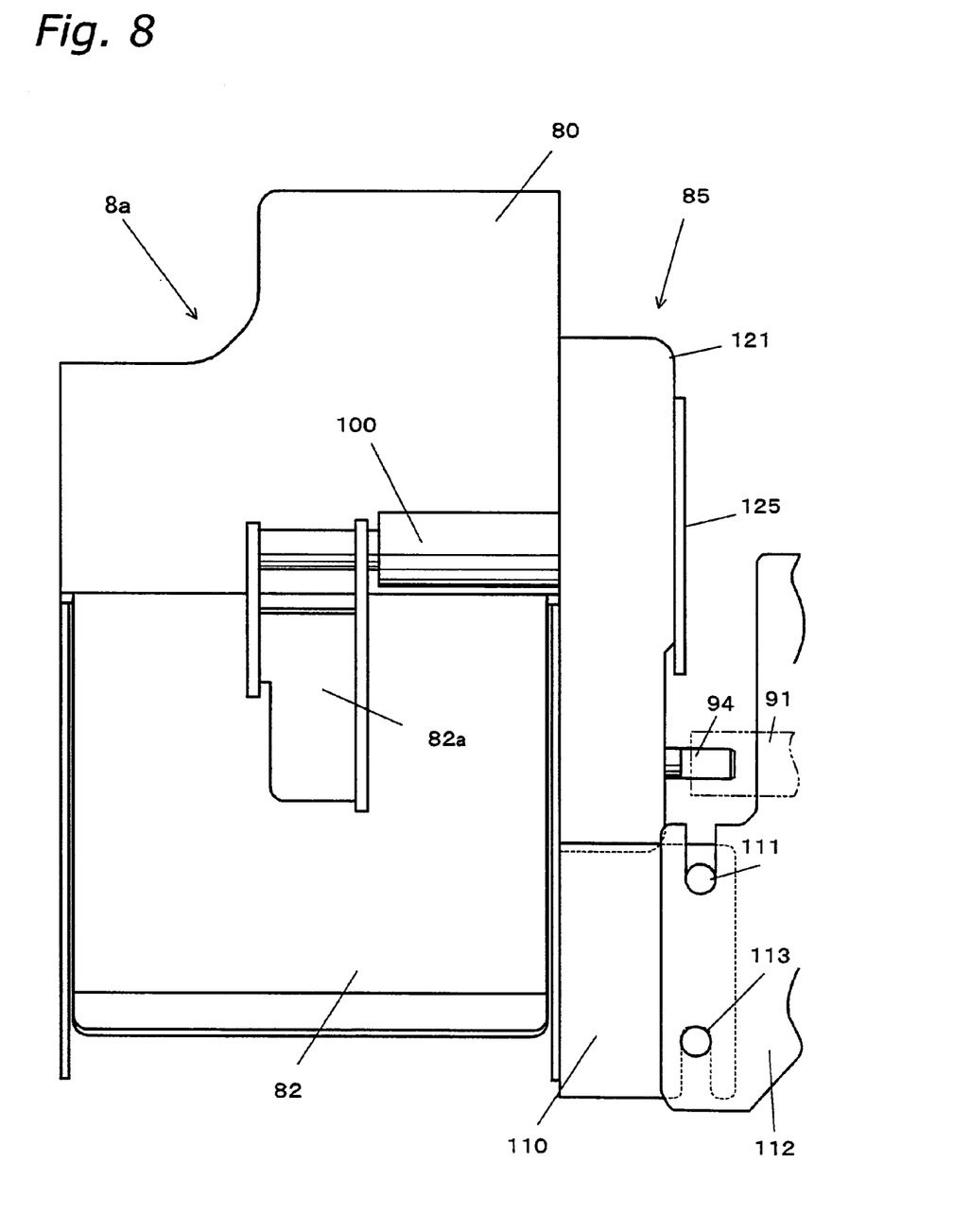
FIG. 8 is a side view of the weighing hopper.

Next, the first and second weighing hoppers 8a, 8b will be described using FIGS. 7 and 8. The first and second weighing hoppers 8a, 8b differ from the pool hopper 7 in that they are connected to load cells 12a, 12b and the articles supplied to the first and second weighing hoppers 8a, 8b are weighed by the load cells 12a, 12b.

As an example, the first weighing hopper 8a (which is arranged closer to the main unit case 3) will now be described in detail. The first weighing hopper 8a has a rectangular box-like body (pipe-like body) 80 that is open at the top and bottom and first and second gates 81, 82 mounted to a lower portion thereof. A plate 83 is attached to one side face of the box-like body 80. A link mechanism 84 for driving the first and second gates 81, 82 is arranged on the plate 83. Also mounted to the plate 83 is a cover 85 for covering the link mechanism 84. This cover is a characteristic feature of the present invention.

The constituent features of the link mechanism 84 of the first weighing hopper 8a will now be described.

A drive shaft 91 extends from the open/close drive mechanism 11a of the main unit case 3 to a lower portion of the plate 83 and its tip end engages with a support shaft 94 that is supported in a freely rotatable manner on a support member 93 fixed with nuts 92, 92.

An input link 95 is supported on the support shaft 94 in such a manner that it can swing freely in the directions of arrows R and S. A roller 96 is provided on the other end of the input link 95 in such a manner that it can rotate freely.

A drive link 97 having a U-shaped tip part is fixed to a support shaft 98 and a driven link 99 is fixed to a support shaft 100. The support shafts 98, 100 are provided on opposite sides of the approximate middle of the plate 83 in such a manner that they can turn freely in the directions of arrows T, U and V, W, respectively. The roller 96 is arranged in the tip part of the drive link 97 such that it can slide freely there-within.

The drive link 97 and the driven link 99 are coupled together through an intermediate link 101 by mean of support shafts 101a, 101b.

The gates 81, 82 are fixed to the support shafts 98, 100 with brackets 81a, 82a.

Similarly to the pool hopper 7, the links 95, 97, 99, 101 of the link mechanism 84 are mounted to their respective support shafts 94, 98, 100, 101a, 101b using bolts and nuts. Also, a bolt is used to fasten the roller 96 to the input link 95.

The operation of the link mechanism 84 of the first weighing hopper 8a will now be described. For example, say the input link 95 supported on the support shaft 94 is swung in the direction of the arrow R by the drive shaft 91 of the open/close drive mechanism 11a. The roller 96 provided on the other end of the input link 95 slides generally downward (i.e., downward as shown in FIG. 7) inside the generally U-shaped part of the drive link 97 and causes the drive link 97 to swing in the direction of the arrow T about the support shaft 98. As a result, the first gate 81, which is fixed to the support shaft 98 by the bracket 81a, moves in the same direction and opens the bottom opening of the box-like body 80. Simultaneously, when the input link 97 swings, the intermediate link 101 connected to the drive link 97 causes the driven link 99 to swing in the direction of the arrow V about the support shaft 100. As a result, the second gate 82, which is fixed to the support shaft 100 by the bracket 82a, moves simultaneously and opens the bottom opening of the box-like body 80.

In this way, by turning the support shaft 94 in the direction of the arrow R, the first and second gates 81, 82 of the first weighing hopper 8a open the bottom opening of the box-like body 80 simultaneously and discharge the articles to the collecting conveyer. Meanwhile, omitting particular descriptions, when the support shaft 94 is turned in the direction of the arrow S, the drive link 97 swings in the direction of the arrow U and the driven link 99 swings in the direction of the arrow W, thus causing the gates 81, 82 to close the bottom opening of the box-like body 80. Thus constituted, the link mechanism 84 can be arranged in such a manner as to be concentrated on one side of the box-like body 80.

Next, the mounting structure used to mount the first weighing hopper 8a to the main unit case 3 will be described. Mounting parts 110 for mounting the first weighing hopper 8a to the main unit case 3 are provided on the plate 83 of the first weighing hopper 8a and configured to extend toward the main unit case 3. Outwardly-protruding engaging rods 111, 111 are provided on comparatively upper portions of the mounting parts 110, 110 and notches are provided on comparatively lower parts.

A pair of hopper support parts 112 configured to extend toward the first weighing hopper 8a is connected to the load cell 12a inside the main unit case 3. An engaging rod 113 is provided such that it spans between comparatively lower portions of the tip edges of the hopper support parts 112 and notches that can engage with the engaging rods 111, 111 are provided in comparatively upper portions of the same. The distance between the tip edges of these hopper support members 112 is slightly larger than the distance between the mounting parts 110, 110 of the first weighing hopper 8a.

When the first weighing hopper 8a is mounted to the main unit case 3, the engaging rods 111, 111 of the mounting parts 110, 110 of the first weighing hopper 8a engage with the notches in the hopper support members 112 of the main unit case 3 and the engaging rod 113, 113 of the hopper support members 112 of the main unit case 3 engages with the notches of the first weighing hopper 8a. In this way, the first weighing hopper 8a is supported on the main unit case 3. By using this kind of structure, the first weighing hopper 8a can be easily attached to and detached from the main unit case 3. Although explanation of the second weighing hopper 8b has been omitted, the second weighing hopper 8b is mounted to the sub case 4 using the same method as the similarly constructed first weighing hopper 8a.

Figure 9:
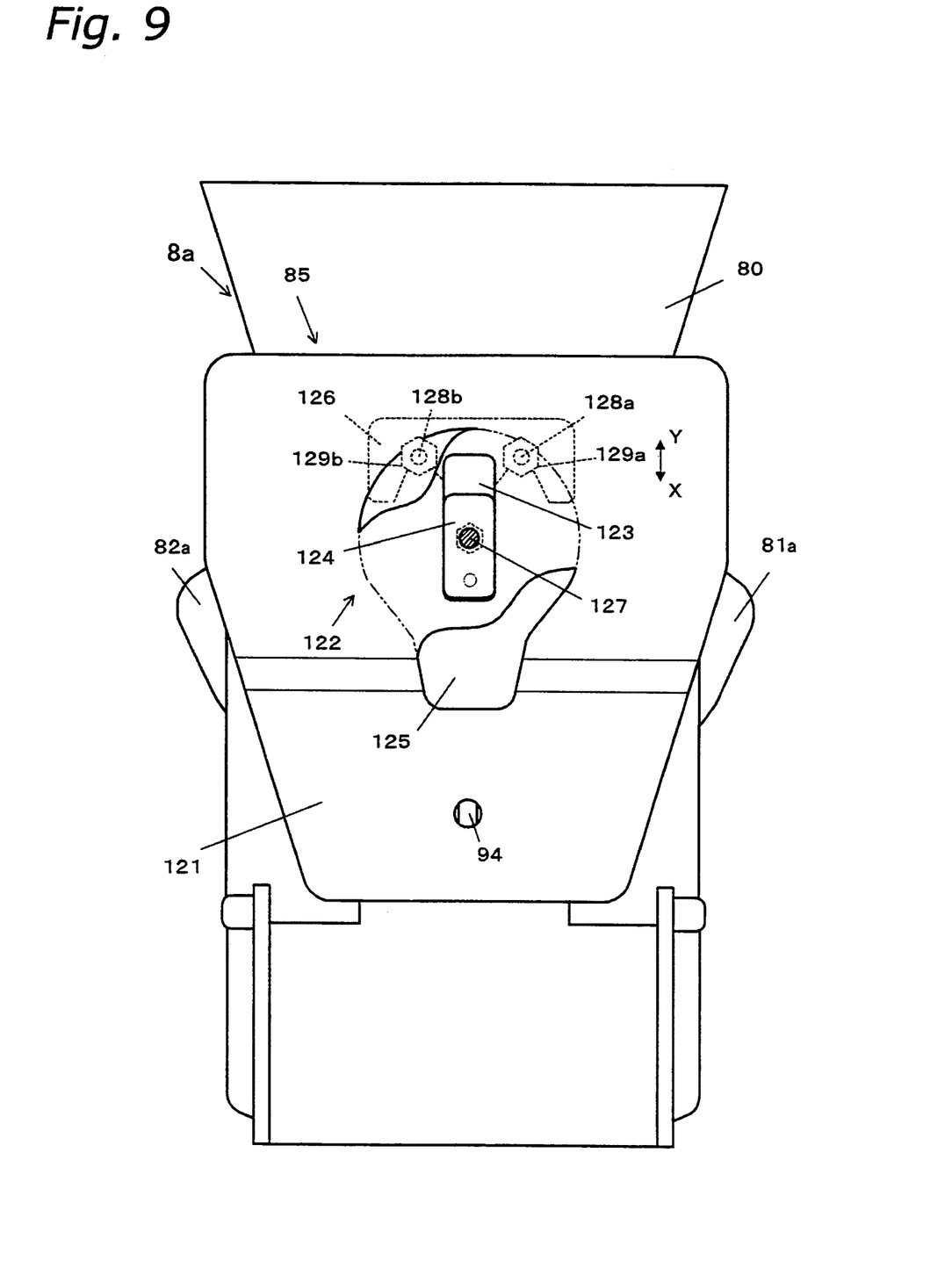
FIG. 9 is a rear view illustrating the cover attachment/detachment mechanism of the weighing hopper.

Next, the cover 85, which is a characteristic feature of the present invention, will be described using FIGS. 7, 8, and 9. The cover 85 is made up of a cover main body 121 and an attachment/detachment mechanism 122. The cover main body 121 is shaped such that it covers the entire link mechanism 84 and is provided with a slight step between the upper part and lower part thereof. The cover main body 121 is provided with a long hole 123 in the vicinity of the center of the upper part thereof. The support shaft 94 protrudes from a hole provided in the lower part of the cover main body 121.

Meanwhile, the attachment/detachment mechanism 122 includes a slide member 124 arranged such that it can slide in the long hole 123, an attachment/detachment operating member 125, an engaging member 126, and a nut 127 that fastens the engaging member 126 to the attachment/detachment operating member 125 with the slide member 124 disposed there-between. The slide member 124 is shaped such that its short side is approximately the same size as that of the long hole 123 but its long side is shorter, and the slide member 124 is arranged such that it can move in the directions of arrows X and Y within the long hole 123. The attachment/detachment operating member 125 is mounted to the outside of an upper portion of the cover main body 121. The engaging part 126 is arranged on the inside of the cover main body 121 and has notches in two locations in a lower portion thereof.

Nuts 129a, 129b having narrowed bases are screwed onto bolts 128a, 128b mounted above the intermediate link 101. The two notches provided in the engaging part 126 engage the bases of the nuts 129a, 129b.

Thus, by moving the attachment/detachment operating member 125 in the direction of the arrow X, the cover main body 121 can be fixed in a prescribed position by engaging the notches of the engaging part 126 with the nuts 129a, 129b.

Figure 10:
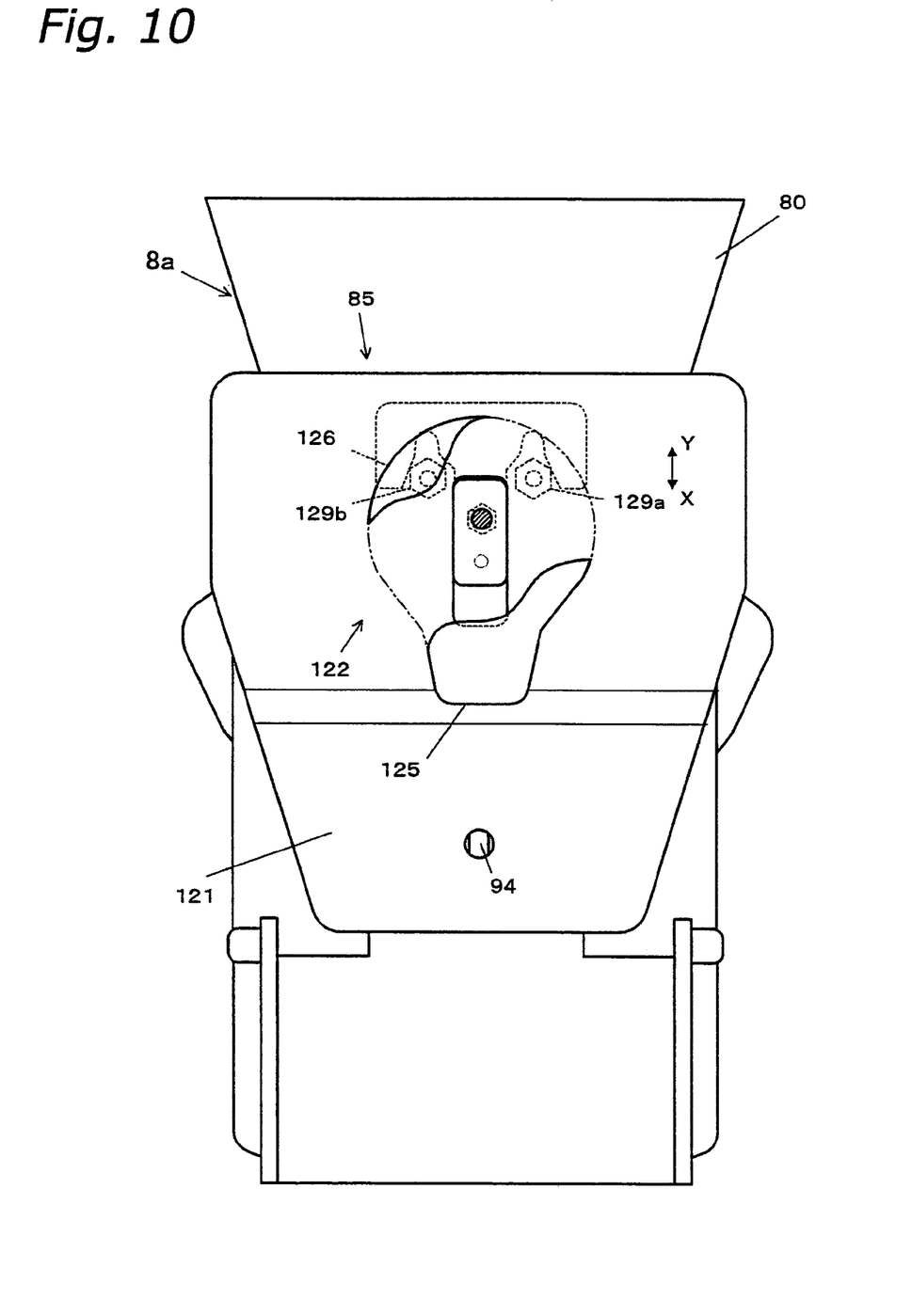
FIG. 10 is a rear view illustrating the operation of the cover attachment/detachment mechanism of the weighing hopper.

As shown in FIG. 10, when the cover main body 121 is detached from the box-like body 80, the attachment/detachment operating member 125 is moved in the direction of the arrow Y so that the engaging member 126 disengages from the nuts 129a, 129b, allowing the cover main body 121 to be removed with ease.

Similarly to the pool hopper 7, many nuts and bolts are used in the link mechanism 84 of the first weighing hopper 8a and it is reasonable to believe that vibrations resulting from operation of the combination weighing apparatus might cause some of these nuts and bolts to fall out of place and become intermixed with the articles on the collecting conveyer 9 below. However, since a cover 121 is mounted to the box-like body 80, fallen bolts and nuts will be caught by the cover main body 121 and prevented from intermixing with the articles. Similarly, fragments resulting from damage to component parts of the link mechanism 84 caused by vibrations are also prevented from intermixing with the articles.

Also, since the link mechanism 84 is so arranged as to be concentrated on one side of the box-like body 80, only one cover 85 is needed to cover the link mechanism 84. Moreover, since the cover 85 can be freely attached to and detached from the box-like body 80, it is easier to clean the inside of the cover 85 as well as the main unit case 3 (or the sub case 4 in the case of the second weighing hopper 8b) and it is also easier to perform maintenance on the link mechanism 84. Although explanation of the second weighing hopper 8b is omitted because the construction is the same, the same operational effects are obtained with the second weighing hopper 8b.

Furthermore, although a combination weighing apparatus 1 in accordance with the embodiment presented heretofore is configured such that pool hoppers 7 . . . 7 and weighing hoppers 8a . . . 8a, 8b . . . 8b are arranged in rows, the present invention can also be applied to a combination weighing apparatus in which the troughs, pool hoppers, and weighing hoppers are arranged in a circular fashion.

APPLICABILITY TO INDUSTRY

Since the present invention features the idea of attaching covers configured to cover the link mechanisms of the hoppers in a combination weighing apparatus, the present invention can solve the problem of fragments of resin parts and other component parts that have been damaged by the vibrations resulting from opening and closing: the gates, as well as bolts, nuts, and other parts of the link mechanism that have become loose due to vibrations, falling and becoming mixed into the articles. Also, since the link mechanism is so arranged as to be concentrated on one side of the box-like bodies, only one cover is needed to cover each link mechanism. Moreover, cleaning and maintenance can be accomplished more easily because the covers are constructed in such a manner that they can be attached and detached easily.

The invention claimed is:

1. A hopper comprising:
    a pipe-like body that has top and bottom openings;
    a gate configured to swing freely with respect to the pipe-like body and open and close the bottom opening of the pipe-like body;
    a link mechanism configured to transmit driving power from an external drive source in such a manner as to swing the gate; and
    a cover that is directly attached to the pipe-like body at a position below the link mechanism such that the cover covers the link mechanism at least from below.

2. The hopper as recited in claim 1, wherein
    the cover covers the entire link mechanism.

3. The hopper as recited in claim 1, wherein
    the link mechanism is arranged on one side of the pipe-like body.

4. The hopper as recited in claim 1, wherein
    the cover is configured in such a manner that can be freely attached to and detached from the pipe-like body.

5. The hopper as recited in claim 4, wherein
    the pipe-like body has a nut coupled thereto, and
    the cover has
        a main body having a bore,
        a slide member slidably coupled to the bore, and
        an engagement member that is coupled to the slide member and has a notch, the cover being attached to the pipe-like body by engaging the notch of the engagement member to the nut of the pipe-like body.

6. A weighing apparatus for weighing articles, comprising:
    a main case having a first drive source and a load cell installed therein;
    a trough disposed above the main case for supplying articles; and
    a first hopper supported on the main case below the trough and including
        a first pipe-like body that has top and bottom openings;
        a first gate configured to swing freely with respect to the first pipe-like body and open and close the bottom opening of the first pipe-like body;
        a first link mechanism configured to transmit driving power from the first drive source in such a manner as to swing the first gate; and
        a first cover that is directly attached to the first pipe-like body at a position below the first link mechanism such that the first cover covers the first link mechanism at least from below.

7. The weighing apparatus as recited in claim 6, wherein the first cover covers the entire first link mechanism.

8. The weighing apparatus as recited in claim 6, wherein the first link mechanism is arranged on one side of the first pipe-like body.

9. The weighing apparatus as recited in claim 6, wherein the first cover is configured in such a manner that can be freely attached to and detached from the first pipe-like body.

10. The weighing apparatus as recited in claim 9, wherein the first pipe-like body has a nut coupled thereto, and the first cover has
    a main body having a bore,
    a slide member slidably coupled to the bore, and
    an engagement member that is coupled to the slide member and has a notch, the first cover being attached to the first pipe-like body by engaging the notch of the engagement member to the nut of the first pipe-like body.

11. The weighing apparatus as recited in claim 6, further comprising
    a second drive source installed in the main case; and
    a second hopper supported on the main case below the first hopper and including
        a second pipe-like body that has top and bottom openings;
        a second gate configured to swing freely with respect to the second pipe-like body and open and close the bottom opening of the second pipe-like body;
        a second link mechanism configured to transmit driving power from the second drive source in such a manner as to swing the second gate; and
        a second cover that covers the second link mechanism at least from below, the load cell weighing articles in the second hopper.

* * * * *